(12) United States Patent
Djuknic

(10) Patent No.: US 7,894,504 B2
(45) Date of Patent: Feb. 22, 2011

(54) COHERENT AND NON-COHERENT HYBRID DIRECT SEQUENCE/FREQUENCY HOPPING SPREAD SPECTRUM SYSTEMS WITH HIGH POWER AND BANDWIDTH EFFICIENCY AND METHODS THEREOF

(75) Inventor: Goran Djuknic, Tenafly, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 811 days.

(21) Appl. No.: 11/880,564

(22) Filed: Jul. 23, 2007

(65) Prior Publication Data

US 2009/0028219 A1   Jan. 29, 2009

(51) Int. Cl.
*H04B 1/00* (2006.01)
(52) U.S. Cl. ..................... 375/140
(58) Field of Classification Search ......... 375/130, 375/131, 136, 140, 146, 147, 298, 344, 133, 375/143, 144, 148, 267, 295, 316, 346; 370/319, 370/334, 336, 346, 430, 535
See application file for complete search history.

(56) References Cited

U.S. PATENT DOCUMENTS

| | | | | |
|---|---|---|---|---|
| 6,278,722 | B1* | 8/2001 | Evans | 375/133 |
| 6,289,038 | B1* | 9/2001 | Park | 375/131 |
| 6,522,637 | B1* | 2/2003 | Mimura et al. | 370/319 |
| 7,656,931 | B2* | 2/2010 | Smith et al. | 375/131 |
| 7,660,338 | B2* | 2/2010 | Smith et al. | 375/131 |
| 2002/0075907 | A1* | 6/2002 | Cangiani et al. | 370/535 |
| 2003/0095587 | A1* | 5/2003 | Schilling | 375/143 |
| 2005/0141594 | A1* | 6/2005 | Smith et al. | 375/130 |

OTHER PUBLICATIONS

Dixon; "Spread Spectrum Techniques"; pp. 50-59, Pub date 1984.
R.L. Peterson, R.E. Ziemer and D.E. Borth; Introduction to Spread Spectrum Communications, Prentice Hall, 1995, pp. 75-78.

\* cited by examiner

*Primary Examiner*—David C Payne
*Assistant Examiner*—Syed Haider
(74) *Attorney, Agent, or Firm*—RatnerPrestia

(57) ABSTRACT

A hybrid spread spectrum system includes a signal combiner for (a) receiving a plurality of spread spectrum encoded data signals and (b) forming a plurality of combined signals. A first set of mixers is included for (a) receiving the plurality of combined signals and at least two carriers, and (b) forming at least a two-carrier, constant envelope signal. A second set of mixers is also included for (a) receiving the at least two-carrier, constant envelope signal and a transmitter hopping signal and (b) forming a hybrid spread spectrum signal. The combined signals include (a) $[s_1(t)-s_1(t)s_2(t)s_3(t)]$ and (b) $[s_2(t)+s_3(t)]$, where $s_i(t)$ are three separate spread spectrum encoded data signals. The transmitter hopping signal is a sequence of tones having (a) a duration $T_c$, where $T_c$ is a chip duration, and (b) frequencies $f_n$ taken from a set of $2^k$ values, where k is a number of bits from a pseudo-random noise (PRN) sequence.

17 Claims, 4 Drawing Sheets

COHERENT AND NON-COHERENT HYBRID DIRECT SEQUENCE/FREQUENCY HOPPING SPREAD SPECTRUM SYSTEMS WITH HIGH POWER AND BANDWIDTH EFFICIENCY AND METHODS THEREOF

TECHNICAL FIELD

The present invention relates, in general, to spread spectrum communications. More specifically, the present invention relates to hybrid spread spectrum systems, which use both direct sequence and frequency hopping operations.

BACKGROUND OF THE INVENTION

Spread spectrum systems operate by spreading the spectrum of the communications signal well beyond the bandwidth of the unspread signal. Motivation for using spread spectrum signals is based on the following facts: (1) These systems have the ability to reject unintentional jamming by interfering signals so that information may be communicated. (2) Spread spectrum signals minimize interference with competing users since the power transmitted is spread over a large frequency bandwidth. (3) Since these signals cannot be readily demodulated without knowing the code and its precise timing, message privacy is attained. (4) The wide bandwidth of spread spectrum signals provides tolerance to multi-path propagation. (5) Multiple access or the ability to send many independent signals over the same frequency band is possible using spread spectrum techniques. Systems employing spread spectrum methods to communicate in a secure and non-interfering manner are well-known in the art.

Spread spectrum systems may spread the communications signal using direct sequence or frequency hopping methods. In a direct sequence spread spectrum system, data bits are modulated with a spreading sequence before transmission. Each bit of information is modulated with a series of chips from the spreading sequence. The number of chips per bit defines the processing gain. A greater number of chips per bit creates a greater immunity to noise and other interference.

The band spread is accomplished by means of a code that is independent of the data, and a synchronized reception with a code at the receiver is used for despreading the incoming signal. In operation, a data signal is multiplied by a pseudo-random noise (PN) sequence having a faster data rate than the data signal to be transmitted.

Prior to application of the spreading code to the information bit stream, the information bits may undergo a series of digital operations which further increase the performance of the system. For example, the information bits may undergo differential encoding in order to be more tolerant to an incorrect phase lock in the receiver's phase locked loop (PLL). The information bits may be scrambled using a long scrambling sequence in order to further decrease the vulnerability of the system to interception.

Direct sequence spread spectrum coding may use binary phase shift keying (BPSK). In a phase shift keyed system, information is carried in the phase of the signal. Two different phases are used to denote two different digital values. Whenever the sequence transitions from a "1" to a "0" or from a "0" to a "1", the phase of the signal transitions. Such a system is referred to as a BPSK system.

Another form of spread spectrum is called frequency-hopped spread spectrum, where the carrier frequency signal is moved (hopped) around in the band in a pseudo-random fashion. The result is an increase in effective bandwidth over time. Specifically, in a frequency hopped spread spectrum system the carrier frequency is shifted in discrete increments in a pattern generated by a code sequence. In such a system, the signal frequency remains constant for a specified time duration, referred to as a hopping time. The system may be either a fast hop system or a slow hop system. In a fast hop system, the frequency hopping occurs at the rate that is greater than the message bit rate. In a slow hop system, the hop rate is less than the message bit rate. There is also an intermediate situation in which the hop rate and message bit rate are of the same order of magnitude.

Hybrid spread spectrum systems, which use both direct sequence and frequency hopping to spread the original spectrum, come in different forms and their operation is extensively described in the literature. Spread spectrum systems that use multiple carriers are also known in the literature. What does not appear in any of the literature, however, is that the output signal of hybrid multi-carrier spread spectrum systems may have a constant envelope.

Since a conventional hybrid spread spectrum system does not transmit a signal having a constant envelope, it has shortcomings. A main shortcoming is low power efficiency, since a high power amplifier cannot operate efficiently when the input signal does not have a constant envelope. Another downside of such a system is its low bandwidth efficiency, since the common way to increase throughput is to increase bandwidth.

The present invention addresses systems and methods for generating hybrid spread spectrum signals, using both direct sequence and frequency hopping, having constant envelopes.

SUMMARY OF THE INVENTION

To meet this and other needs, and in view of its purposes, the present invention provides a hybrid spread spectrum system. The system includes a signal combiner for (a) receiving a plurality of spread spectrum encoded data signals and (b) forming a plurality of combined signals. A first set of mixers is included for (a) receiving the plurality of combined signals and at least two carriers, and (b) forming at least a two-carrier, constant envelope signal. A second set of mixers is also included for (a) receiving the at least two-carrier, constant envelope signal and a transmitter hopping signal and (b) forming a hybrid spread spectrum signal. The combined signals include (a) $[s_1(t)-s_1(t)s_2(t)s_3(t)]$ and (b) $[s_2(t)+s_3(t)]$, where $s_i(t)$ are three separate spread spectrum encoded data signals. The transmitter hopping signal is a sequence of tones having (a) a duration $T_c$, where $T_c$ is a chip duration, and (b) frequencies $f_n$ taken from a set of $2^k$ values, where k is a number of bits from a pseudo-random noise (PRN) sequence.

The two carrier, constant envelope signal includes a first carrier modulated by $[s_1(t)-s_1(t)s_2(t)s_3(t)]$ and a second carrier modulated by $[s_2(t)+s_3(t)]$. The $s_i(t)$ are three separate spread spectrum encoded data signals. The first set of mixers receives at least three carriers and forms at least a three-carrier constant envelope signal, and the second set of mixers receives the at least three-carrier constant envelope signal and forms the hybrid spread spectrum signal. The second set of mixers includes a summer for combining signals outputted by the second set of mixers, and a high pass filter (HPF) for (a) receiving a signal from the summer and (b) producing a single sideband of the hybrid spread spectrum signal.

Another embodiment of the invention is a hybrid spread spectrum system having a plurality of frequency shift keying (FSK) modulators for forming at least two FSK modulated carriers. A first set of mixers is included for (a) receiving the at least two FSK modulated carriers and a plurality of PRN codes, and (b) forming at least two direct spread carriers. A second set of mixers is also included for (a) receiving the at least two direct spread carriers and a transmitter hopping signal, and (b) forming a hybrid spread spectrum signal having a constant envelope. The plurality of PRN codes includes (a) $[c_1(t)-c_1(t)c_2(t)c_3(t)]$ and (b) $[c_2(t)+c_3(t)]$, where $c_i(t)$ are three separate PRN codes. The transmitter hopping signal is a sequence of tones having (a) duration $T_c$, where $T_c$ is a chip duration, and (b) frequencies $f_n$ taken from a set of $2^k$ values, where k is a number of bits from a PRN sequence. The at least two direct spread carriers include a first carrier modulated by $[c_1(t)-c_1(t)c_2(t)c_3(t)]$ and a second carrier modulated by $[c_2(t)+c_3(t)]$, where $c_i(t)$ are three separate PRN codes. The second set of mixers includes a summer for combining signals outputted by the second set of mixers, and a HPF for (a) receiving a signal from the summer and (b) producing a single sideband of the hybrid spread spectrum signal.

Yet another embodiment of the present invention is a method for transmitting a hybrid spread spectrum signal. The method includes the steps of: (a) forming at least two FSK modulated carriers; (b) (i) receiving the at least two FSK modulated carriers and a plurality of PRN codes, and (ii) forming at least two direct spread spectrum carriers, and (c) (i) receiving the at least two direct spread carriers and a transmitter hopping signal, and (ii) forming a hybrid spread spectrum signal having a constant envelope. The plurality of PRN codes includes (i) $[c_1(t)-c_1(t)c_2(t)c_3(t)]$ and (ii) $[c_2(t)+c_3(t)]$, where $c_i(t)$ are three separate PRN codes. The transmitter hopping signal is a sequence of tones having (i) duration $T_c$, where $T_c$ is a chip duration, and (ii) frequencies $f_n$ taken from a set of $2^k$ values, where k is a number of bits from a PRN sequence. The at least two direct spread carriers include a first carrier modulated by $[c_1(t)-c_1(t)c_2(t)c_3(t)]$ and a second carrier modulated by $[c_2(t)+c_3(t)]$, where $c_i(t)$ are three separate PRN codes.

The method further includes the steps of: (d) high pass filtering the hybrid spread spectrum signal having the constant envelope, and (e) transmitting the high pass filtered hybrid spread spectrum signal of step (d).

It is understood that the foregoing general description and the following detailed description are exemplary, but are not restrictive, of the invention.

BRIEF DESCRIPTION OF THE FIGURES

The invention is best understood from the following detailed description when read in connection with the accompanying figures.

DETAILED DESCRIPTION OF THE INVENTION

The present invention is a hybrid spread spectrum system, which uses both direct sequence and frequency hopping techniques. The present invention has multipath and jamming resistant properties of similar conventional systems, but overcomes their shortcomings through use of a novel method for combining the spreading codes, and the use of multiple carriers that hop simultaneously. The arrangement of codes that spread the hopping carriers is such that it produces a composite output signal with a constant envelope. This makes the present invention power efficient, since high power amplifiers may be operated in their optimal mode, that is, close to the 1 dB (saturation) point.

In addition, since multiple carriers hop simultaneously, the throughput of the system is increased in comparison with single carrier hopping systems. Every one of the carriers may be separately modulated by an independent data stream, or a high rate data stream may be inversely multiplexed onto several carriers. Furthermore, multiple carriers may be used to combat multipath or jamming, since redundancy in transmission may be achieved by having the same information repeated on two or more carriers. Finally, the single sideband property of the system included in the present invention achieves high bandwidth efficiency.

As will be explained, the present invention includes coherent and non-coherent systems. Both systems use a combination of direct sequence and frequency hopping for carrier spreading, but they differ in the way in which the data modulates the carriers. In a BPSK (or DPSK) system, data demodulation has to be coherent, but in an FSK system, data may be demodulated non-coherently, which is a big advantage in wireless systems.

Figure 1:
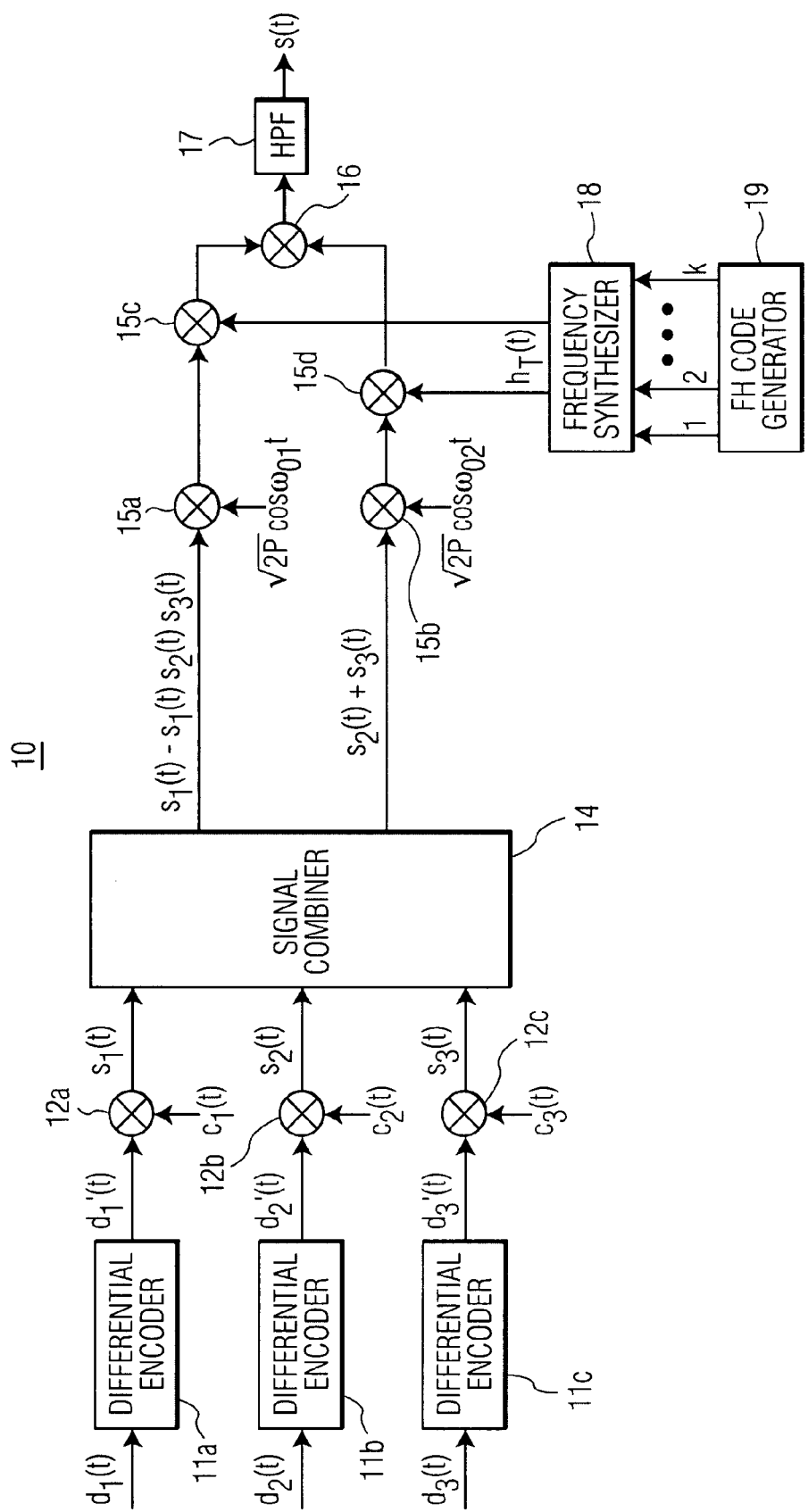
FIG. 1 is a block diagram of a coherent hybrid frequency hopping/direct sequence (FH/DS) system for generating an FH/DS signal, in accordance with an embodiment of the present invention.

Referring to FIG. 1, there is shown a coherent hybrid frequency hopping/direct sequence (FH/DS) system for generating an FH/DS signal, the hybrid system generally designated as 10. As shown, two carriers are hopping simultaneously. The carriers are modulated with three data streams, which may either originate from independent sources or be a result of inverse multiplexing of a single high data rate source.

It will be appreciated that the signal generated by the hybrid system of FIG. 1 is exemplary and is provided to illustrate the concept. The system may be easily extended to include more than two carriers and more than three data streams.

The present inventor in U.S. application Ser. No. 11/067, 148, filed on Feb. 25, 2005, describes generation of a two carrier, constant envelope signal. Description of the system and method of generating this two carrier constant envelope signal is incorporated herein by reference in its entirety.

As described in the aforementioned U.S. application, consider a two-carrier, constant envelope signal, such as:

$$z(t) = \sqrt{2P}[s_1(t)-s_1(t)s_2(t)s_3(t)] \cos \omega_{01}t + \sqrt{2P}[s_2(t)+s_3(t)] \cos \omega_{02}t \quad (1)$$

where P is the signal power, and $$s_1(t)=d'_1(t)c_1(t)$$

$$s_2(t)=d'_2(t)c_2(t)$$

$$s_3(t)=d'_3(t)c_3(t) \quad (2)$$

Signals $d'_i(t)$ are obtained by differentially encoding data sequences $d_i(t)$. Differential encoding, however, is not necessary for the present invention. Signals $c_i(t)$ are pseudo-random (PRN) sequences with rates much higher than rates of $d_i(t)$, so they act like spreading codes. Both data and PRN signals take on values of ±1.

To produce the output RF signal, z(t) is used to modulate the transmitter hopping signal, which is a sequence of tones of duration $T_c$ as follows:

$$h_T(t) = \sum_{n=-\infty}^{\infty} 2p(t - nT_c)\cos 2\pi f_n t \quad (4)$$

Frequency $f_n$ is taken from a set of $2^k$ values, where k is the number of bits from the PRN sequence that is taken at the time to determine the current hopping frequency value. Pulse p(t) has unit amplitude in $0 \leq t \leq T_c$, where $T_c$ is the chip duration. Therefore, the output signal is $$s(t) = \quad (5)$$
$$\sqrt{2P} \sum_{n=-\infty}^{\infty} p(t - nT_c)\{[s_1(t) - s_1(t)s_2(t)s_3(t)]\cos(\omega_{01} + \omega_n)t + [s_2(t) + s_3(t)]\cos(\omega_{02} + \omega_n)t\}$$

Referring again to FIG. 1, coherent hybrid system 10 includes differential encoders 11a, 11b and 11c for differentially encoding data sequences $d'_i(t)$ to produce signal $d'_i(t)$. (In another embodiment (not shown), the differential encoders are not used.) Mixers 12a, 12b and 12c, each multiply $d'_i(t)$ with $c_i(t)$, the $c_i(t)$ being PRN sequences, to produce the $s_i(t)$ signals.

Signal combiner 14, which also includes multiplier functions, receives the $s_i(t)$ signals and produces the following two combined signals:

$s_1(t)-s_1(t)s_2(t)s_3(t)$ and
$s_2(t)+s_3(t)$

Each combined signal is then multiplied, using respective mixers 15a and 15b, by a corresponding carrier, $\cos \omega_{01} t$ and $\cos \omega_{02} t$ (where $\omega = 2\pi f$) to produce two modulated carriers, as shown.

Next, the two modulated carriers are multiplied, using respective mixers 15c and 15d, by the transmitter hopping signal $h_T(t)$ (Equation 4). Frequency hopping code generator 19 and frequency synthesizer 18 produce the hopping signal. Summer 16 and high pass filter (HPF) 17, which are inserted serially in system 10, produce the final output signal s(t) (Equation 5). It will be appreciated that output signal s(t) may be transmitted via an antenna (not shown).

The sum-frequency is passed through a transmit high pass filter (HPF). The signal in Equation (5) is a hybrid, direct sequence/frequency hopping spread spectrum (DS/FH-SS) signal. Namely, two direct sequence spread carriers at frequencies $f_{01}+f_n$ and $f_{02}+f_n$ hop simultaneously.

In addition, signal s(t) has a constant envelope, because $$[s_1(t)-s_1(t)s_2(t)s_3(t)]^2 + [s_2(t)+s_3(t)]^2 = const \quad (6)$$

and $$[s_1(t)-s_1(t)s_2(t)s_3(t)][s_2(t)+s_3(t)] = 0 \quad (7)$$

Figure 2A:
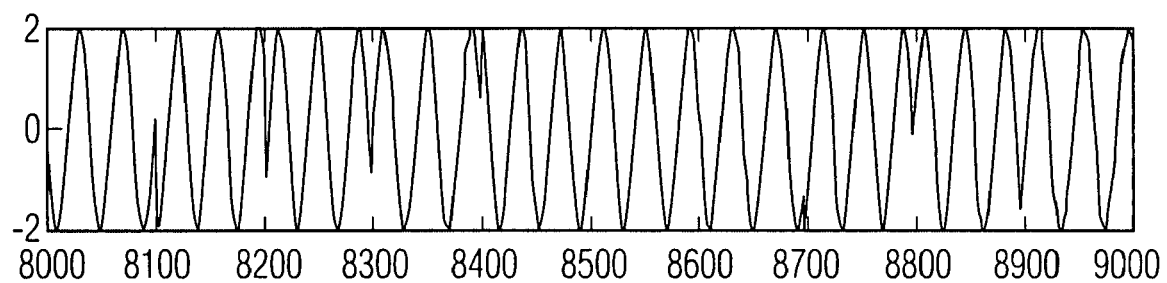
FIG. 2A is a plot of amplitude versus time for the output signal generated by the system of FIG. 1.
Figure 2B:
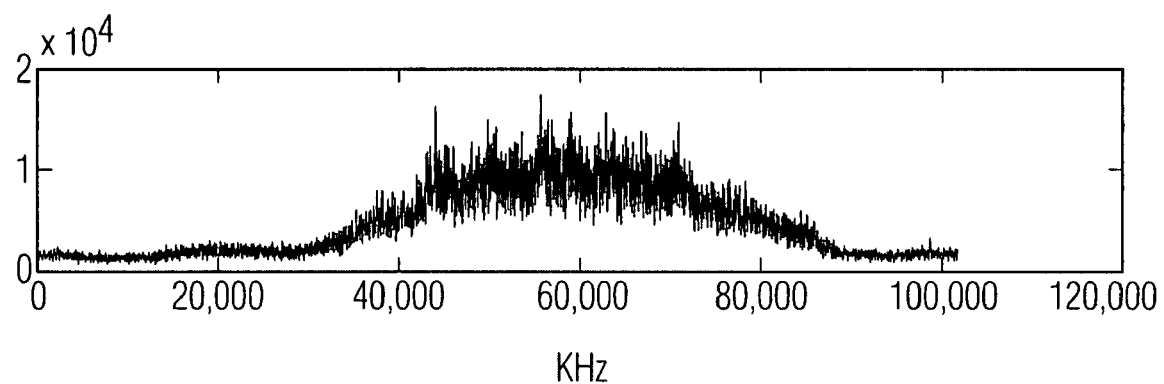
FIG. 2B is a spectral plot of power versus frequency of the output signal generated by the system shown in FIG. 1.

The signal, which is generated using the system shown in FIG. 1, and its spectrum are shown in FIGS. 2A and 2B, respectively. In this example, the number of hopping frequencies is 100; the hopping range is from 40 to 70 MHz; the fixed offset frequencies $f_{01}$ and $f_{02}$, are 5 MHz apart; the data and direct sequence spreading modulations are BPSK. The hopping and direct spreading sequences need not be synchronized. The signal has a constant envelope.

When the signal generated by the system of FIG. 1, namely s(t), is transmitted and received by a receiver (not shown), it may be demodulated by any conventional spread spectrum receiver, including a despreader and a demodulator. The demodulator, of course, should be a coherent demodulator.

A disadvantage in using the signal s(t) shown in FIG. 1 is that it requires coherent demodulation, which is difficult to accomplish in frequency hopping systems. Therefore, the present invention also provides a system and method for generating signals that may be demodulated non-coherently, but are also of a hybrid FH/DS type and have a constant envelope.

Figure 3:
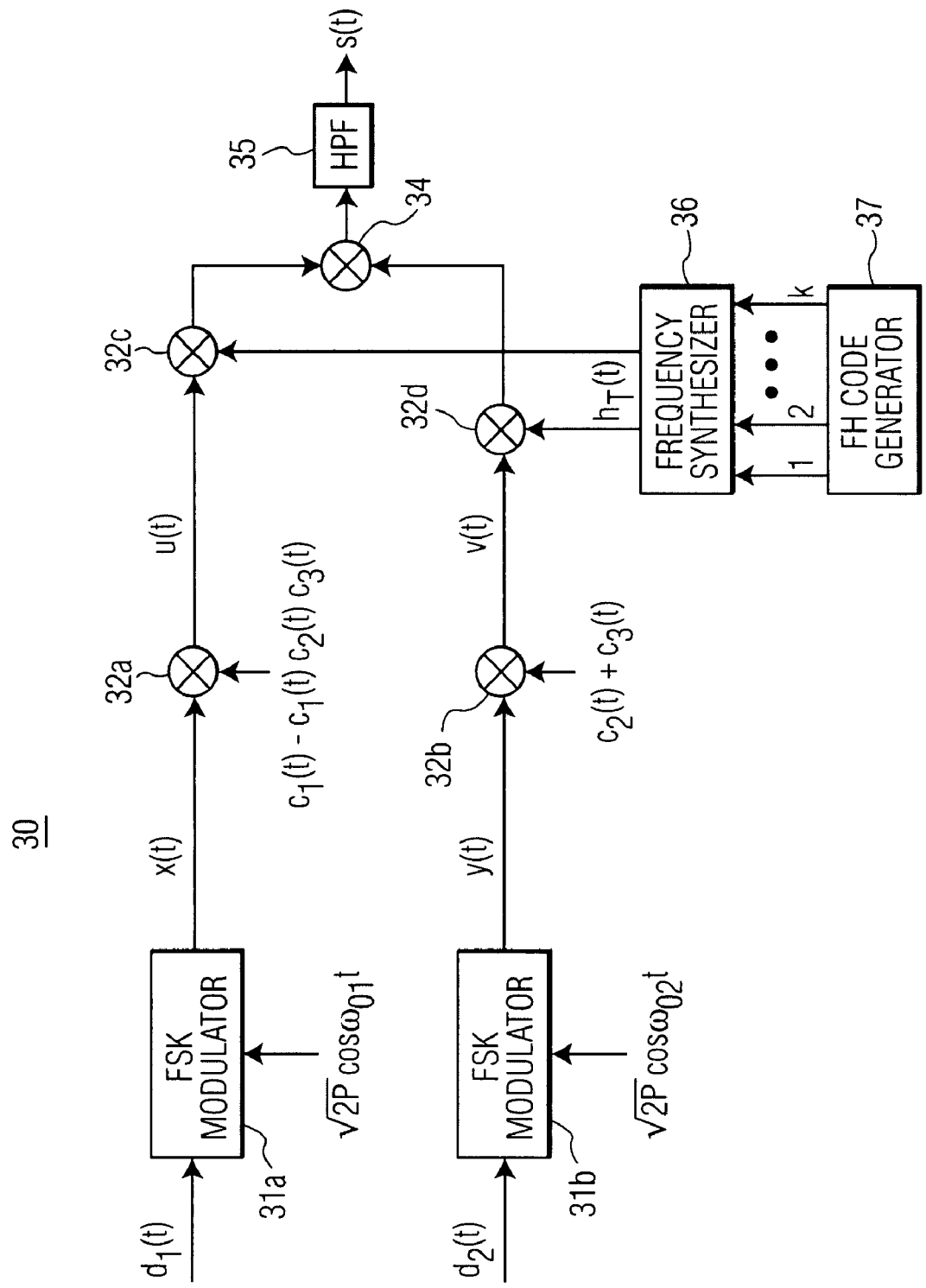
FIG. 3 is a block diagram of a coherent hybrid frequency hopping/direct sequence (FH/DS) system for generating an FH/DS signal, in accordance with another embodiment of the present invention.

An exemplary non-coherent hybrid FH/DS system is shown in FIG. 3, and is generally designated as 30. In the example of system 30, data modulation is binary FSK and two independent data streams are used to modulate two carriers that jointly hop. The method, however, may be expanded to multilevel FSK to achieve greater throughput; and to multiple independent data streams that modulate multiple carriers which hop simultaneously for further increase in information capacity. In addition, instead of independent data streams, an inversely multiplexed high rate data sequence may be used to modulate the hopping carriers.

For example, consider the following BFSK modulated carriers:

$$x(t) = \sqrt{2P} \cos 2\pi [f_{01} + d_1(t)\Delta]t \quad (8)$$

and $$y(t) = \sqrt{2P} \cos 2\pi [f_{02} + d_2(t)\Delta]t \quad (9)$$

where
$f_{01}$ and $f_{02}$ are fixed FSK center frequencies;
$d_1(t)$ and $d_2(t)$ are data signals taking on values $\pm 1$;

$$\Delta = \frac{1}{2T}$$

is half the distance between orthogonal BFSK signals; and
T is the data bit duration.

For simplicity, it is assumed that both data signals have the same rate, but that is not required for the operation of the method and, in general, the rates may be different and do not have to be commensurable.

By using combinations of PRN codes $c_1(t)$, $c_2(t)$, and $c_3(t)$, the present invention direct-spreads the carriers from Equations (8) and (9) to $$u(t) = \sqrt{2P}[c_1(t) - c_1(t)c_2(t)c_3(t)] \cos 2\pi [f_{01} + d_1(t)\Delta]t \quad (10)$$

and $$v(t) = \sqrt{2P}[c_2(t) + c_3(t)] \cos 2\pi [f_{02} + d_2(t)\Delta]t \quad (11)$$

The signals u(t) and v(t) shown in Equations (10) and (11) are each further spread by the transmitter hopping sequence of Equation (4), then combined into a composite signal. The sum-frequency components of the composite signal is passed to the antenna via a high pass filter (HPF). The entire output signal is given by $$s(t) = \sqrt{2P} \sum_{n=-\infty}^{\infty} p(t - nT_c)\{[c_1(t) - c_1(t)c_2(t)c_3(t)]\cos 2\pi [f_n + f_{01} + d_1(t)\Delta]t + [c_2(t) + c_3(t)]\cos 2\pi [f_n + f_{02} + d_2(t)\Delta]t\} \quad (12)$$

Referring still to FIG. 3, non-coherent hybrid system 30 includes FSK modulators 31a and 31b for modulating carrier signals with the data signals. As shown, the FSK modulators provide output signals x(t) and y(t).

Mixers 32a and 32b multiply x(t) and y(t), respectively, with combinations of PRN codes, namely, $c_1(t)-c_1(t)c_2(t)c_3(t)$, and $c_2(t)+c_3(t)$ to produce u(t) and v(t), as shown. It will be understood that the combinations of PRN codes are produced by a signal combiner, which may be similar to signal combiner 14 shown in FIG. 1.

Next, mixers 32c and 32d multiply signals u(t) and v(t), respectively, with the transmitter hopping signal $h_T(t)$. Similar to system 10, the transmitter hopping signal is produced by FH code generator 37 and frequency synthesizer 36. Finally, summer 34 and HPF 35 combine and filter, respectively, the signals to output s(t) (Equation 12). Output signal s(t) may be transmitted by way of an antenna (not shown).

Signal s(t), which is generated by non-coherent hybrid system 30, may be demodulated by any conventional receiver. Coherent detection is, of course, not necessary.

Figure 4A:
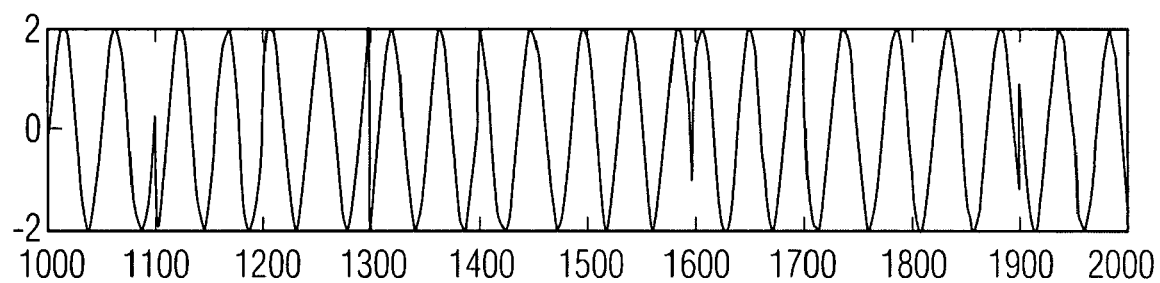
FIG. 4A is a plot of amplitude versus time for the output signal generated by the system of FIG. 3.
Figure 4B:
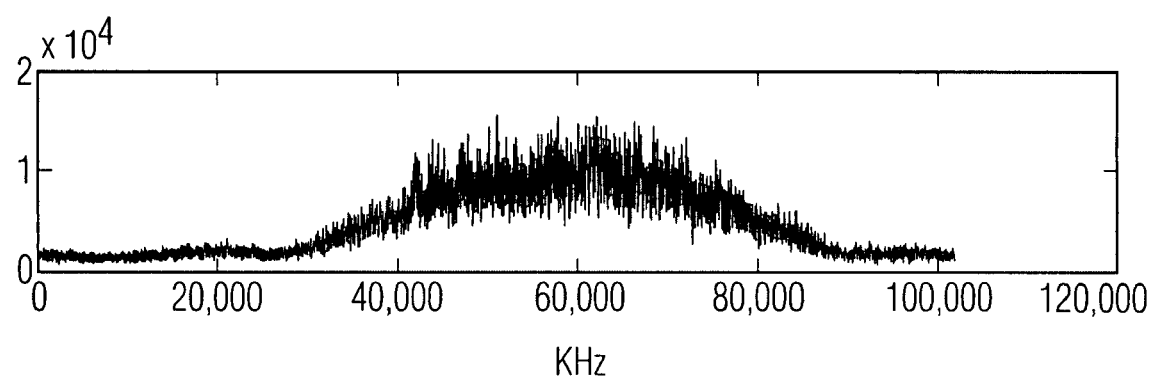
FIG. 4B is a spectral plot of power versus frequency of the output signal generated by the system shown in FIG. 3.

The signal generated by hybrid system 30, as well as its spectrum are shown in FIGS. 4A and 4B, respectively. In this example, the number of hopping frequencies is 1000; hopping range is from 40 to 70 MHz; fixed offset frequencies $f_{01}$ and $f_{02}$ are 5 MHz apart; data modulation is BFSK; hopping direct sequence spreading and data are not synchronized. As shown in FIG. 4A, the signal s(t) has a constant envelope.

The present invention is applicable to all frequency hopped spread spectrum systems in which higher throughput is desired, but the switch to multilevel modulation schemes (e.g. MFSK) is not a good option due to channel characteristics. Although the scheme is multi carrier, the constant envelope property of single carrier frequency hopped systems is preserved, which means that the present invention produces power-efficient systems. The invention is, therefore, especially applicable to mobile and portable systems where preservation of battery power is of special importance. Furthermore, the output signal generated by the present invention is essentially single sideband, making the scheme bandwidth efficient. This makes the present invention applicable to situations where the available spectrum has to be shared by many different wireless systems.

What is claimed:

1. A hybrid spread spectrum system comprising
a signal combiner for (a) receiving a plurality of spread spectrum encoded data signals and (b) forming a plurality of combined signals,
a first set of mixers for (a) receiving the plurality of combined signals and at least two carriers, and (b) forming at least a two-carrier, constant envelope signal, and
a second set of mixers for (a) receiving the at least two-carrier, constant envelope signal and a transmitter hopping signal and (b) forming a hybrid spread spectrum signal,
wherein
the combined signals include (a) $[s_1(t)-s_1(t)s_2(t)s_3(t)]$ and (b) $[s_2(t)+s_3(t)]$, where $s_i(t)$ are three separate spread spectrum encoded data signals.

2. The hybrid spread spectrum system of claim 1, wherein the transmitter hopping signal is a sequence of tones having (a) a duration $T_c$, where $T_c$ is a chip duration, and (b) frequencies $f_n$ taken from a set of $2^k$ values, where k is a number of bits from a pseudo-random noise (PRN) sequence.

3. The hybrid spread spectrum system of claim 1, wherein the two carrier, constant envelope signal includes a first carrier modulated by $[s_1(t)-s_1(t)s_2(t)s_3(t)]$ and a second carrier modulated by $[s_2(t)+s_3(t)]$,
where $s_i(t)$ are three separate spread spectrum encoded data signals.

4. The hybrid spread spectrum system of claim 1, wherein
the first set of mixers receives three carriers and forms a three-carrier constant envelope signal, and
the second set of mixers receives the three-carrier constant envelope signal and forms the hybrid spread spectrum signal.

5. The hybrid spread spectrum system of claim 1, wherein
the second set of mixers includes a summer for combining signals outputted by the second set of mixers, and
a high pass filter (HPF) for (a) receiving a signal from the summer and (b) producing a single sideband of the hybrid spread spectrum signal.

6. The hybrid spread spectrum system of claim 1, wherein
the plurality of spread spectrum encoded data signals include differentially encoded data sequences modulated by PRN sequences with rates higher than rates of the encoded data sequences.

7. The hybrid spread spectrum system of claim 1, wherein $[s_1(t)-s_1(t)s_2(t)s_3(t)]^2+[s_2(t)+s_3(t)]^2$=constant, and $[s_1(t)-s_1(t)s_2(t)s_3(t)][s_2(t)+s_3(t)]=0$ for forming a constant envelope signal for the hybrid spread spectrum signal.

8. A hybrid spread spectrum system comprising
a plurality of frequency shift keying (FSK) modulators for forming at least two FSK modulated carriers,
a first set of mixers for (a) receiving the at least two FSK modulated carriers and a plurality of PRN codes, and (b) forming at least two direct spread carriers, and
a second set of mixers for (a) receiving the at least two direct spread carriers and a transmitter hopping signal, and (b) forming a hybrid spread spectrum signal having a constant envelope,
wherein
the plurality of PRN codes includes (a) $[c_1(t)-c_1(t)c_2(t)c_3(t)]$ and (b) $[c_2(t)+c_3(t)]$, where $c_i(t)$ are three separate PRN codes.

9. A hybrid spread spectrum system of claim 8, wherein
the transmitter hopping signal is a sequence of tones having (a) duration $T_c$, where $T_c$ is a chip duration, and (b) frequencies $f_n$ taken from a set of $2^k$ values, where k is a number of bits from a PRN sequence.

10. A hybrid spread spectrum system of claim 8, wherein
the at least two direct spread carriers include a first carrier modulated by $[c_1(t)-c_1(t)c_2(t)c_3(t)]$ and a second carrier modulated by $[c_2(t)+c_3(t)]$,
where $c_i(t)$ are three separate PRN codes.

11. A hybrid spread spectrum system of claim 8, wherein
the second set of mixers includes a summer for combining signals outputted by the second set of mixers, and
a HPF for (a) receiving a signal from the summer and (b) producing a single sideband of the hybrid spread spectrum signal.

12. A hybrid spread spectrum system of claim 8, wherein $[c_1(t)-c_1(t)c_2(t)c_3(t)]^2+[c_2(t)+c_3(t)]^2$=constant, and $[c_1(t)-c_1(t)c_2(t)c_3(t)][c_2(t)+c_3(t)]=0$ for forming the hybrid spread spectrum signal having the constant envelope.

13. A method for transmitting a hybrid spread spectrum signal comprising the steps of:
(a) forming at least two FSK modulated carriers;
(b) (i) receiving the at least two FSK modulated carriers and a plurality of PRN codes, and (ii) forming at least two direct spread spectrum carriers; and
(c) (i) receiving the at least two direct spread carriers and a transmitter hopping signal, and (ii) forming a hybrid spread spectrum signal having a constant envelope;
wherein
the at least two direct spread carriers include a first carrier modulated by $[c_1(t)-c_1(t)c_2(t)c_3(t)]$ and a second carrier modulated by $[c_2(t)+c_3(t)]$,
where $c_i(t)$ are three separate PRN codes.

14. The method of claim 13, wherein
the plurality of PRN codes includes (i) $[c_1(t)-c_1(t)c_2(t)c_3(t)]$ and (ii) $[c_2(t)+c_3(t)]$, where $c_i(t)$ are three separate PRN codes.

15. The method of claim 13, wherein
the transmitter hopping signal is a sequence of tones having (i) duration $T_c$, where $T_c$ is a chip duration, and (ii) frequencies $f_n$ taken from a set of $2^k$ values, where k is a number of bits from a PRN sequence.

16. The method of claim 13, further comprising the steps of:
(d) high pass filtering the hybrid spread spectrum signal having the constant envelope, and
(e) transmitting the high pass filtered hybrid spread spectrum signal of step (d).

17. The method of claim 13, wherein $[c_1(t)-c_1(t)c_2(t)c_3(t)]^2+[c_2(t)+c_3(t)]^2=\text{constant},$ and $[c_1(t)-c_1(t)c_2(t)c_3(t)][c_2(t)+c_3(t)]=0$ for forming the hybrid spread spectrum signal having the constant envelope.

* * * * *